Nov. 8, 1949     G. R. KERN     2,487,143
METHOD OF MAKING DENTURES
Filed Feb. 4, 1947     6 Sheets-Sheet 1

Inventor
George R. Kern
By Cushman, Darby & Cushman
Attorneys

Nov. 8, 1949 G. R. KERN 2,487,143
METHOD OF MAKING DENTURES
Filed Feb. 4, 1947 6 Sheets-Sheet 2

Inventor
George R. Kern
By Cushman, Darby & Cushman
Attorneys

Nov. 8, 1949 — G. R. KERN — 2,487,143
METHOD OF MAKING DENTURES
Filed Feb. 4, 1947 — 6 Sheets-Sheet 6

Inventor
George R. Kern
By Cushman, Darby & Cushman
ATTORNEYS

Patented Nov. 8, 1949

2,487,143

UNITED STATES PATENT OFFICE 2,487,143

METHOD OF MAKING DENTURES

George R. Kern, Arlington, Va.

Application February 4, 1947, Serial No. 726,369

6 Claims. (Cl. 32—2)

This invention relates to a new and improved method of making dentures. It further relates to a new and improved method of locating errors in dentures as well as to improvements in precision mechanism used to determine the errors.

Throughout the following description the terms "dental plate" or "denture" are used interchangeably to describe any artificial tooth supporting device including a gum contacting surface; the term "impression" is used to describe elements having a gum contacting surface complemental to the contour of the patient's gum, while the terms "cast" or "model" describe elements having a surface duplicating the patient's gum. In other words, insofar as the patient's gum is concerned, an impression may be regarded as a negative, while the cast or models are positives.

In the methods now practiced in making dental plates by molding a plate over a cast formed from an impression taken of the mouth, it is a well known fact that owing to the unavoidable expansion and contraction from heating and cooling of the plate during the formation thereof, the plate very often becomes distorted so that it will not fit the patient's mouth, and particularly the patient's gum, as desired, nor will its gum contacting surface be of such contour as to be an exact facsimile of the corresponding contours of an impression of the patient's gum. Likewise, the gum contacting surface of the denture will not properly fit a cast produced from an impression of the gum.

It is an object of this invention to provide a method of producing dental plates which will overcome the effects of the distortion caused by stresses and strains in the plate during its fabrication, and to thereby produce a denture having a gum contacting surface which will conform strictly with the gum configuration of the impression and will accurately fit the part of the mouth for which it is intended, thereby relieving the wearer of the discomforts now attendant the fitting and wearing of dental plates.

A further object is to provide a method of locating and measuring errors in already formed dental plates.

Still another object is to reduce the time now consumed by the dentist and patient in fitting a dental plate to a patient's mouth and thereby reducing the overall costs involved in obtaining dental plates.

For a more complete understanding of the nature and scope of this invention reference can be had to the following detailed description taken in connection with the accompanying drawings in which.

The first phase of the method is the making of a dental plate which is substantially like the impression of the part of the mouth for which it is intended, except that it is so prepared that there is slightly too much material on the surface which contacts the gum. The second phase of the method is the placing of the dental plate in a special duplicating or profiling machine and milling off the excess material on its gum contacting surface so that such contacting surface is of a duplicate contour and size of an impression of the patient's gum.

FIRST PHASE

In the making of new dental plates or rebasing and relining already-formed dental plates, the conventional steps usually followed are carried out except that such plates are so prepared that there is slightly too much material on the surface which is to contact the mouth. This excess material is later removed in whole or in part as may be necessary to compensate for dimensional change owing to the unavoidable expansion and contraction from heating and cooling during the usual formation of dental plates and to render the dental plate contacting surface of a duplicate contour and size to an impression of the patient's gum.

Making a dental plate

Figure 7:
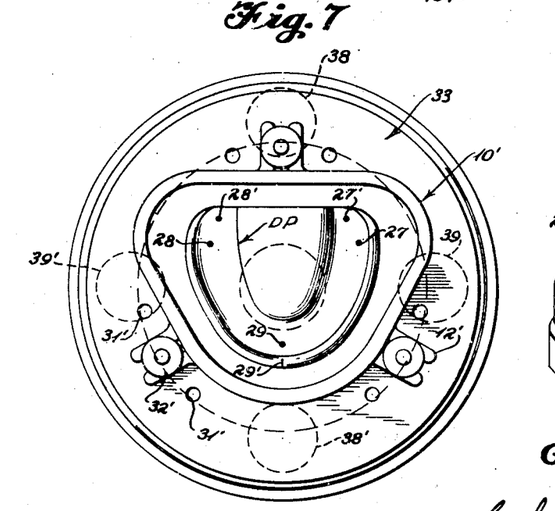
Figure 7 is a plan view of the adjustable positioning platform which is the left hand platform shown in Figure 3, having secured to its face a molding form carrying a dental plate. The view is as seen from a position above the machine in Figure 1.
Figure 12:
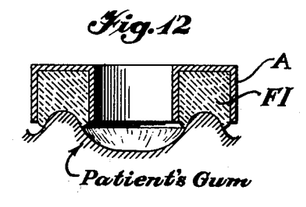
Figures 12 to 20 diagrammatically show stages in the formation of a dental plate according to the process of the present invention.

In the making of a dental plate by this method, an impression is taken of the mouth, i. e., the gum and perhaps teeth. This impression is hereinafter referred to as the first impression. Figure 12 is a cross section through a portion of a gum, the first impression FI of customary material being taken by use of a dental tray A of usual type. It is desirable to have certain reference marks made in the impression for aligning purposes, as will be described later under the Second phase of the method. The reference marks also serve to maintain the proper occlusion of the dental plate being prepared.

Where the impression FI taken is an upper impression, a reference mark is usually left in the forward and upper part of the contact surface, viz., the gum contacting surface of the impression by the Freeman muscle. In case such a reference mark does not occur, a reference mark is cut into the forward and upper part of the contact surface of the impression. As additional reference marks, three spaced point marks are made with a sharp, pointed instrument in the rear center portion of the upper contact surface of the impression in the palatal area. One of such later mentioned point marks is sufficient in connection with the forward reference mark for aligning purposes, but two additional impression point marks are made in case some of these marks are lost in the subsequent transfer steps in the preparation of the dental plate.

Where the impression FI taken is a lower impression, a reference mark is cut into the extreme forward part of the contact surface of the impression for aligning purposes, as is shown in Figure 7 at 29'. Likewise, as in the case of the upper impression, additional reference marks are made in the lower impression. The additional reference marks are made by making a point impression, preferable toward the extreme rear of each condyle area in the lower impression, as shown in Figure 7 at 27' and 28'. As in the case of the upper impression, two reference marks in the lower impression are normally sufficient for aligning purposes and for maintaining the correct occlusion, but the additional reference mark is made as a precautionary measure.

Having taken an impression FI, of the mouth, viz., the gum and teeth, and marked the impression with reference marks as described supra, the next step of the process can be undertaken. The same method applies, whether an upper or a lower dental plate is being made, and the following description will, therefore, apply to either the preparation of an upper or a lower dental plate.

Figure 13:
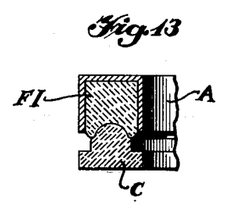
Figure 14:
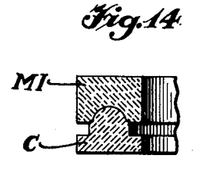

In the preferred method, a cast or model is made from the first impression FI by using an impression material, such as a hydrocolloid alginous material. Figure 13 shows the model or cast C being formed from the impression FI. Over this model C, there are formed in succession duplicate impressions of the first impression by using a suitable molding plaster or composition. The reference marks, as placed in the first impression, will appear in each of these duplicate impressions. The first of these duplicate impressions is termed, master impression, and it is used in the Second phase, the milling operation of the method. The second duplicate impression is termed, second dpulicate impression. Figure 14 shows the master impression MI being formed from cast C. The second duplicate impression 2DI (Figure 15) or any other duplicate impressions can be formed in the same manner.

The master impression reference marks are covered with any suitable masking material, to preserve the marks, and the rest of the impression may be covered with a very thin coating of a sealer, such as a lacquer, to preserve the contact surface.

The first impression FI, as taken of the mouth, and the second duplicate impression 2DI, are both used in the forming of the dental plate.

The first impression FI is used in the conventional steps usually followed in forming a dental plate, except that the dental plate is so formed that there is slightly too much material on the surface which is to contact the mouth, as will hereinafter be described.

Figure 15:
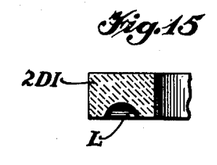

The reference marks in the second duplicate impression 2DI are covered with a suitable masking material to preserve the marks. Then the second duplicate impression 2DI is coated, except for the masking areas, with a coating L as indicated in Figure 15. The coating L is preferably a hard coating such as a lacquer, and has a thickness of a few thousandths of an inch. After this coating has dried, the masking material placed over the reference marks is removed and the impression may be coated with a thin coating of a parting material. For purposes of illustration, the thickness of the coating L is exaggerated in Figures 15 and 16.

Figure 17:
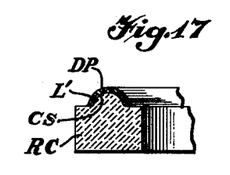

The impression 2DI in this state is now used to make a cast or model RC composed of a suitable hard type casting plaster or composition. The reduced cast RC so obtained is slightly smaller than the part of the mouth that it represents, in view of the few thousandths of an inch thickness of coating that was applied to the second duplicate impression from which it was cast. Over the reduced cast RC there is formed the dental plate or denture DP by the conventional steps usually followed except that the dental plate so formed has slightly too much material on the surface which is to contact the mouth. This step is indicated in Figure 17. The portion L' of the dental plate DP shown below the dotted lines in Figures 17 and 19 comprises the extra material applied thereto by reason of the reduced size of the cast RC. Hence, the contact surface CS of the dental plate is correspondingly reduced.

The following is a more detailed explanation of the sequence of various steps that may be followed in forming a dental plate DP which is substantially like the impression FI of the part of the mouth for which it is intended, except that the plate so formed will have slightly too much material on its contacting surface.

The impression FI taken of the mouth, as described supra, may be coated with a thin coating of parting material. This impression is now used to make the cast or model C (Figure 13) composed of a suitable casting plaster or composition. Over the model C so formed, there is molded (see Figure 18) a temporary dental plate TD of suitable material, such as wax, and there is properly positioned in this temporary dental plate as it is being formed, the teeth T which are to be carried by the permanent dental plate and which are substituted for the natural teeth to be replaced. The temporary dental plate TD carrying the teeth, is applied to the mouth for adjusting the alignment of the teeth as may be necessary and for forming the outside surface of the wax material for a proper fit.

Figure 16:
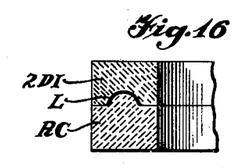
Figure 18:
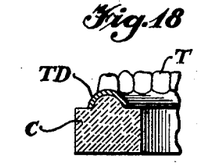

The reduced model RC which was prepared from the second duplicate impression 2DI as indicated in Figure 16 may now be coated with a thin coating of parting material. The reduced model RC in this state is placed in an articulator or other suitable holding device. The temporary dental plate TD carrying its properly aligned teeth is placed over this reduced model RC and in an articulator as shown in Figure 18. Then, in accordance with known prior practice, a molding plaster or composition is applied to the outside of the temporary dental plate TD and around the exposed portions of the teeth carried thereby. The wax of which the temporary dental plate is made is now removed by subjecting it to heat and thereby causing it to melt and flow. The teeth are now held in proper position by the surrounding molding plaster after the temporary dental plate material has been removed.

Figure 19:
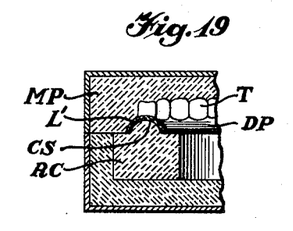

Following the removal of the temporary dental plate material, a plastic composition of which the permanent dental plate DP is composed is poured in a flowing state into the space formerly occupied by the temporary dental plate, and the permanent dental plate material surrounds and holds the portions of the teeth formerly held by the temporary dental plate. Figure 19 indicates this process, MP designating the molding plaster, T the teeth held in the plaster, and DP generally indicating the denture.

The permanent dental plate may be subjected to a curing treatment as is customary. The molding plaster MP can now be removed leaving the permanent dental plate DP carrying the teeth. This permanent dental plate, with an excess L' of material on the surface CS which is to contact the gum and other tissue bearing surfaces of the mouth, is now ready for the Second phase, the milling operation of the method.

As a modified and alternative method of preparing a permanent dental plate DP which is substantially like the impression of the part of the mouth for which it is intended, except that it will have slightly too much material L' on the contact surface, the following steps are carried out.

The impression FI taken of the mouth as shown in Figure 12 is marked with reference marks as in the previously described method. A cast or model C is made from this impression as in Figure 13 by using an impression material, such as a hydrocolloid alignous material. Over this model, there is formed an impression MI as shown in Figure 14, using a suitable molding plaster or composition. The impression MI so obtained is termed master impression, and it is used in the Second phase, the milling operation of the method.

The master impression reference marks are covered with any suitable masking material, to preserve the marks, and the rest of the impression MI may be covered with a very thin coating of a sealer, such as a lacquer to preserve the contact surface.

Figure 20:
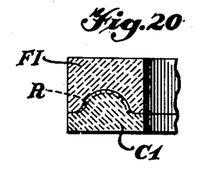

The impression FI taken of the mouth is now coated with a thin coating of parting material and this impression is used to make a second cast or model CI composed of a suitable hard molding plastic or composition as shown in Figure 20. Over the model, there is molded (as shown in Figure 17) a temporary dental plate TD of suitable material, such as a wax and, as in Figure 18, there is properly positioned in the temporary dental plate, as it is being formed, the teeth which are to be carried by a permanent dental plate. The temporary dental plate, carrying the teeth, is applied to the mouth for adjusting the alignment of the teeth and for forming the outside surface for a proper fit.

A thin layer of material is now removed from the surface of the model CI by any suitable means, such as by scraping or by grinding. In carrying out this removal of the surface material, care is taken to not remove the area wherein appears the reference marks. The purpose of reducing the surface of the model is to permit the molding of a permanent dental plate such as DP which is substantially like the impression of the part of the mouth for which it is intended, except that it will have slightly too much material on its contact surface. After the surface of the model has been reduced, it may be coated with a suitable parting material. In Figure 20, the dotted line R indicates, to an exaggerated extent, the depth to which material will be removed from model or cast CI.

The now reduced model CI is placed in an articulator or other suitable holding device. The temporary dental plate such as TD carrying its properly aligned teeth is placed over the model and in the articulator just as indicated in Figure 18. A molding plaster or composition is now applied over the outside of the temporary dental plate and around the exposed portions of the teeth. The wax of which the temporary dental plate is made is removed as by subjecting it to heat and thereby causing it to melt and flow. The teeth are now held in proper position by the surrounding molding plaster after the temporary dental plate material has been removed.

Following the removal of the temporary dental plate material, a plastic composition, of which the permanent dental plate is composed, is poured in a flowing state into the space formerly occupied by the temporary dental plate, and the permanent dental plate material surrounds and holds the portions of the teeth formerly held by the temporary dental plate. In short, the reduced cast CI will be used to perform the step indicated in Figure 19 and in place of the reduced cast RC shown in that figure.

The permanent dental plate similar to DP may be subjected to a curing treatment as is customary. The molding plaster can now be removed, leaving the permanent dental plate with an excess of material on the surface which is in contact with the mouth, and in this condition it is ready for the Second phase, the milling operation, of the method.

*Making a dental plate by rebasing*

If it is desired to rebase a dental plate, the steps as described supra for making a dental plate would be necessarily somewhat altered. The dental plate to be rebased has its inner or contacting surface coated with a suitable impression plaster or composition, and in this condition it is placed in the mouth. An impression is thereby made using the combination of the already formed plate and the impression material.

Reference marks are now placed in this impression in a manner like that described previously under the making of a dental plate.

A cast or model is made from this impression by using an impression material, such as a hydrocolloid alginous material. Over this model, there is formed an impression which is termed master impression. The master impression reference marks are covered with any suitable masking material, to preserve the marks, and the rest of the impression may be covered with a very thin coating of a sealer, such as a lacquer, to preserve the contact surface. This master impression is used in the Second phase, the milling operation, of this method.

The impression formed, by combination of the plate to be rebased and the impression material, is now coated with a coating, preferably a hard coating, such as a lacquer, to a few thousandths of an inch thickness, except for the areas carrying the reference marks which are masked out. After this coating has dried, the masking material placed over the reference marks is removed, and the impression may be coated with a thin coating of a parting material.

The impression in this state is now used to make a cast or model composed of a suitable hard type casting plaster or composition. The reduced model so obtained is slightly smaller than the part of the mouth that it represents, in view of the few thousandths of an inch thickness of coating that was applied to the impression from which the model was cast.

The reduced model as just described is coated with a suitable parting material and is positioned in an articulator or suitable holding device. Over this model there is formed a permanent dental plate such as DP of suitable composition by the customary steps. The teeth that were carried by the plate being rebased are removed from that plate and transferred to the permanent dental plate as is customary.

The permanent dental plate with the teeth properly set therein may now be subjected to a curing operation. This permanent dental plate carries excess material on its contact surface which will be milled off, in the Second phase of the method, so that the finished contact surface will correspond in contour and size to the surface of the master impression and likewise it will properly fit the mouth.

Relining a dental plate

If it is desired to reline a dental plate, the areas to be relined may be scraped out as is customary. An impression material is applied to these areas and in this condition the plate is placed in the mouth. An impression is thereby made using the combination of the plate to be relined and the impression material.

Reference marks are now placed in this impression in a manner similar to that described previously under the making of a dental plate.

A cast or model is made from this impression by using an impression material, such as a hydrocolloid alginous material. Over this model there is formed an impression which is termed master impression. The master impression reference marks are covered with a suitable masking material, to preserve the marks, and the rest of the impression may be covered with a very thin coating of the sealer, such as a lacquer, to preserve the contact surface. This master impression is used in the Second phase, the milling operation, of this method.

The impression material as previously placed in the dental plate being relined is now removed and a permanent relining composition is applied to these areas. A sufficient amount of this relining material is applied so that there is an excess thickness on the surfaces which may be milled off in the Second phase, the milling operation, of this method. The relined plate may be subjected to the customary curing treatment after the relining material has been applied.

In the First phase of making new dental plates or rebasing and relining dental plates, as described in the foregoing steps, a master impression for use in the Second phase of the method was formed over a cast or model made from the impression as taken of the mouth. As an alternative method of obtaining an impression to be used in the Second phase of the method, a second impression can be taken of the mouth. It is also possible to use the same impression as taken of the mouth for the purpose of making the permanent dental plate as well as for the Second phase, the milling operation, of the method.

SECOND PHASE

The permanent dental plates DP as prepared in the First phase described supra are subjected to this Second phase of the method now to be described. The Second phase consists in certain novel steps of placing the permanent dental plate in a special precision duplicating or profiling machine and milling off the excess material on its surface so that the dental plate contacting surface is of a duplicate contour and size of an impression of the mouth.

Figure 8:
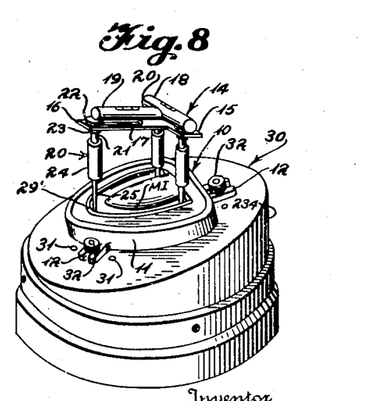
Figure 8 is a perspective view of the fixed positioning platform which is the right hand platform shown in Figure 3, having secured to its face a molding form carrying a master impression in which is placed special spirit levels.

Referring to Figures 7 and 8 of the drawings, there is shown two moulding forms generally indicated as 10 and 10' of polygonal shape, formed with a vertical wall portion 11, having three laterally extending slotted lugs 12 whose bottom surfaces lie in a plane with the bottom of the wall portion 11. Each of the moulding forms 10 and 10' are placed on any suitable level surface (not shown) and within moulding form 10 is placed an impression of the mouth, preferably the master impression MI that was prepared in the First phase of the method. In the space formed between the impression MI and the inside surface of the wall 11 is poured a suitable moulding plaster or composition which serves to hold the impression MI in proper position.

The impression MI is adjusted in the surrounding moulding plaster so that it rests in a level position by means of a special level generally indicated at 14.

The level 14 is comprised of horizontal frame members 15 and 16, arranged perpendicular to each other in the shape of a T. Each of the members 15 and 16 are formed with a slot 17. On the member 15 is fixedly mounted a spirit level 18, and similarly mounted on frame member 16 is a spirit level 19. The spirit levels 18 and 19 join each other in a fixed joint at 20. Slidably mounted within the slots 17 are three depending and supporting adjustable legs, generally indicated at 20. Each leg 20 comprises an upper threaded element 21, having a fixed top element 22, and a securing nut 23 to secure the leg in adjusted position in the slot 17. An internally threaded collar element 24, having a reduced lower portion 25, is adjustably screwed onto the threaded element 21.

In leveling the impression MI, the level 14 is first placed on a suitable flat surface (not shown)

and the legs 20 are adjusted by means of the collar elements 24, so that each spirit level, 18 and 19, indicates a level attitude. The level 14 is now positioned within the impression MI and the two back legs are slidably adjusted laterally and secured in their slots 17 so that they rest in the condyle portions of the impression. The corresponding condyle portions of the dental plate, generally indicated at DP, are shown in Figure 7 at 27 and 28. The front leg of the level 14 is slidably adjusted laterally and secured in its slot 17 so that it is in the forward pocket in the master impression MI. The corresponding pocket of the dental plate DP is shown in Figure 7 at 29. The level 14 is now removed from the impression and rechecked on a flat surface for proper level attitude of each spirit level, 18 and 19. If the levels 18 and 19 need to be adjusted, the leveling adjustment is made, and the level 14 is again placed in position in the impression so that the impression may be moved in the still soft moulding plaster to a level position if it is found necessary.

The permanent dental plate DP, as prepared by the First phase of the method, and which is indicated in Figure 7, is secured in a moulding form 10' by moulding plaster and properly leveled in the same manner as the master impression MI was secured and leveled in its moulding frame 10, just previously described.

The next step is the placement of the moulding form 10, carrying the master impression MI, on a fixed positioning platform or work holder generally indicated at 30 in Figures 1, 3 and 8 which will be described later. The top surface of the fixed positioning platform 30 has three sets of tapped holes 31, each set of which is spaced so as to receive holding down screws 32 which pass through the slots in the lugs 12 on the moulding form 10.

The moulding form 10', carrying the dental plate DP, is placed and secured in the center set of holes 31' on the adjustable positioning platform, generally indicated at 33 in Figures 1, 3 and 7 which will be described later.

It is now necessary to bring the dental plate DP into proper position with respect to the master impression MI. This is first approximately done by using the level generally indicated at 14 in Figure 8. The level 14 is placed in the impression MI so that its back legs rest in the condyle points or areas and its front leg rests on the front point or area in the impression. The legs 20 are adjusted in length by the adjusting collars 24 so that each spirit level 18 and 19 indicates a level attitude.

The level 14 is now removed from the master impression MI and similarly placed in the dental plate DP so that the back legs rest in the condyle points or areas 27 and 28 while the front leg rests in the front point or area 29. If the spirit levels 18 and 19 do not indicate a proper level position of the level 14, the oppositely paired adjusting screws 38—38' and 39—39' (Figure 3) of the adjustable positioning platform 33, are turned so as to bring the spirit levels 18 and 19 into a level attitude. The dental plate DP now lies in a plane which is substantially parallel to a plane through the master impression MI.

Following the approximate positioning of the the dental plate DP with respect to the master impression MI, a final alignment of the dental plate with respect to the master impression is carried out. The pantograph mechanism, a part of the precision duplicating or profiling machine which will be described in detail later, is employed in this aligning operation. An indicator, generally indicated at 34, and a follower tool or tracer, generally indicated at 36, both of which are shown in Figure 11, are also used in this aligning operation.

Figures 2, 11:
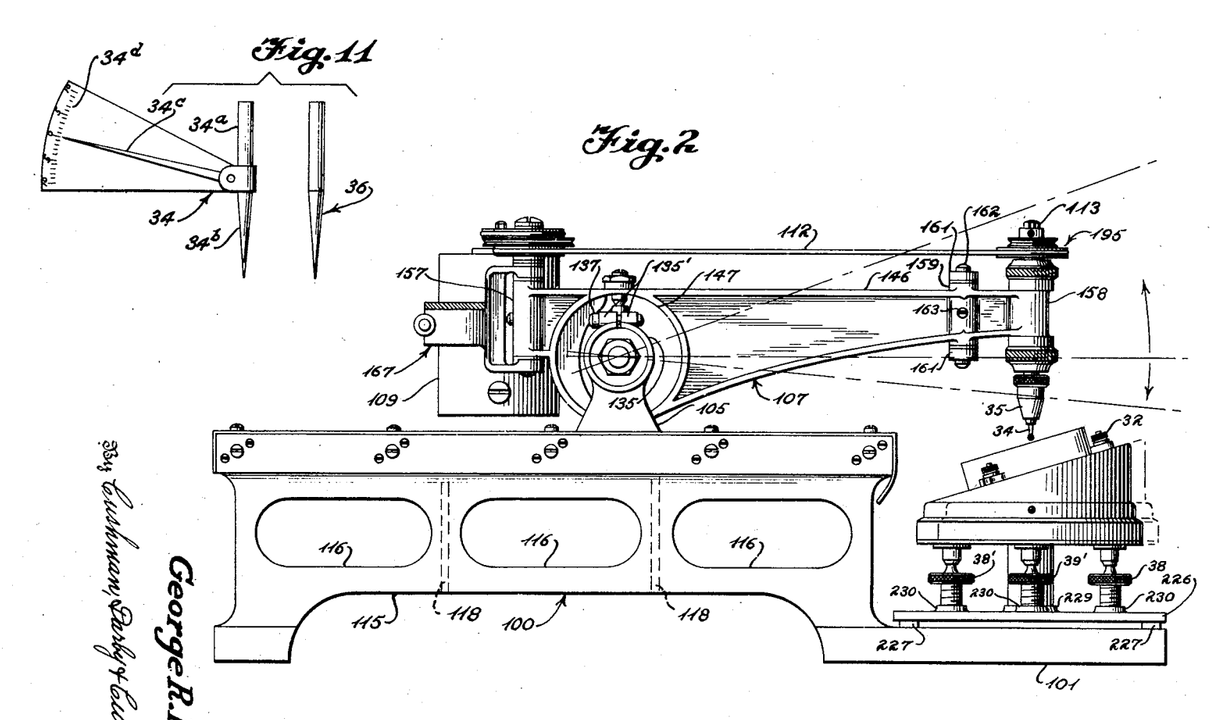
Figure 2 is a side elevation of the mechanism shown in Figure 1.
Figure 11 shows an indicator having a tracing end, and to its right a follower tool having an end with the same contour as the tracing end of the indicator.

Referring to Figure 11, the indicator generally indicated at 34 comprises an upper portion or stock 34a which fits into the chuck, a lower pointed portion 34b which is movable with respect to the upper portion 34a, an indicating pointer 34c which moves in response to movements of the pointed portion 34b, and scale member 34d which is graduated to indicate thousandths of an inch as indicated with its zero or mid-point being in the center of the scale. There is also shown in Figure 11, the follower tool or tracer point, generally indicated at 36, which is of identical size and shape to the corresponding parts of the indicator generally indicated at 34.

Referring to Figure 7, there is shown in the dental plate DP, two back reference points 27' and 28', and a front reference mark 29'. The insertion of these reference marks was described in the First phase of the operation. In the master impression MI, as shown in Figure 8, like reference marks appear.

The final aligning of the dental plate DP with the master impression MI may now be carried out. The indicator 34 is inserted and secured in the milling chuck 35, carried on the left-hand arm of the pantograph mechanism, as shown in Figure 3. The follower tool 36 is inserted and loosely held in the follower chuck 37 on the right-hand arm of the pantograph mechanism.

The point end of the indicator 34 is placed against one of the reference points or marks 27', 28' or 29' in the dental plate DP so that contact is registered by noting a slight movement of the indicator pointer 34c over the scale 34d. The point on the follower tool 36 should now be over the corresponding reference point or mark in the master impression MI. If the follower tool 36 does not show that it is over the corresponding reference mark, the adjustable positioning platform is slid on its slidable mounting, to be described later, to bring the dental plate into lateral adjustment with the master impression. The point of the follower tool 36 is secured in its chuck as it is now resting against a reference mark while the point of the indicator 34 rests against its corresponding reference mark.

Following the alignment by using a set of corresponding reference points, a second set of reference points may now be similarly checked for proper lateral adjustment of the dental plate with respect to the master impression. In this checking operation, the point of the follower 36 is placed against a reference mark and the indicator 34 is observed to see if its point registers with the corresponding reference point in the dental plate. If the lateral alignment is not quite proper, the adjustable positioning platform may be slid on its slidable mounting to bring this set of reference points into lateral alignment.

A recheck of all corresponding reference points may now be made to ascertain that the dental plate is in lateral alignment with the master impression.

The point on the follower tool is now checked against a number of different surface points and the pointer 34c on the indicator 34 is observed to ascertain the average reading on the scale 34d. This is necessary, since the reference points as first checked may have in the making of the dental plate filled a little more on their surface than another reference point. The adjustable positioning platform may have to be slid a slight amount one way or another so that an average reading is finally indicated on the indicator 34 for a number of different points. In case an upper dental plate is being brought into alignment a number of checks would be made for an average reading by checking a number of points around the biting edge of the dental plate.

After the proper alignment has been obtained, the adjustable positioning platform is locked in a secured position by merely setting up on any one of the adjusting screws.

Figures 6, 9, 10:
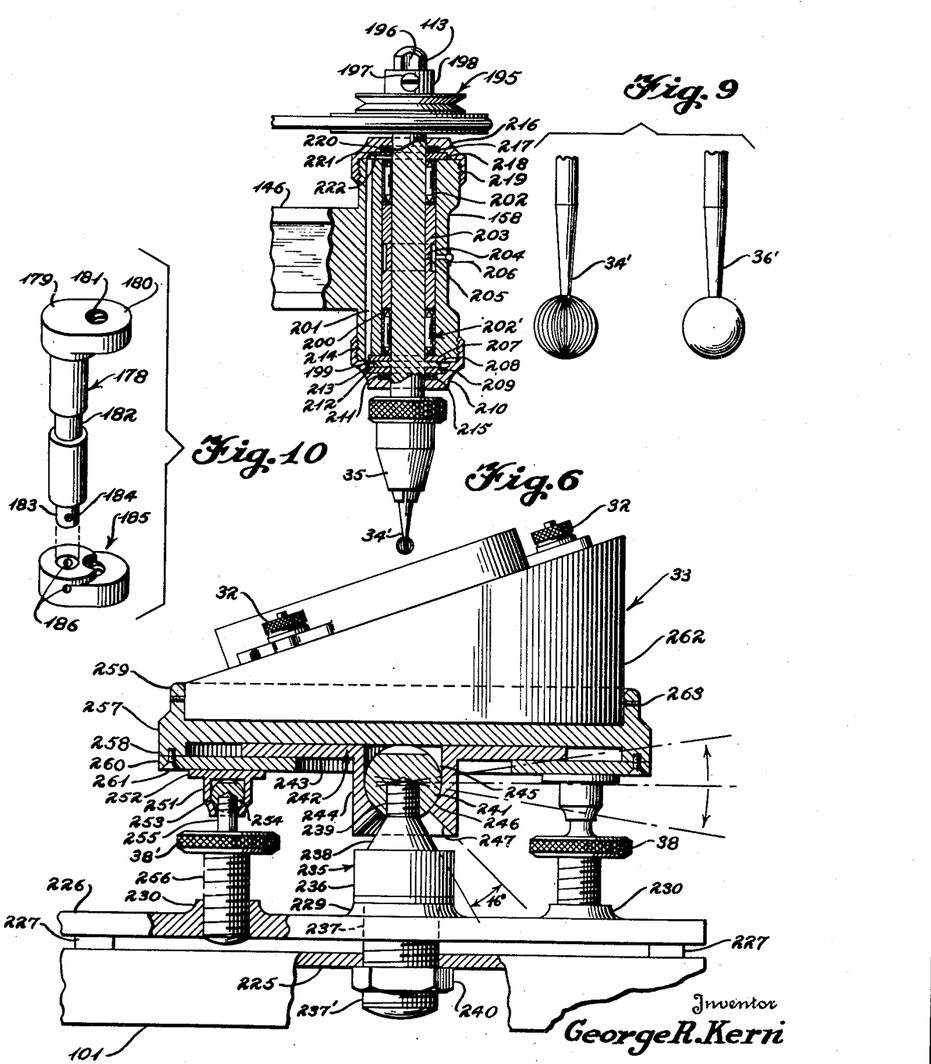
Figure 6 is a vertical view taken on the line 6—6 of Figure 1.
Figure 9 shows a milling cutter or burr with a part of its stem broken away and to its right a follower tool of the same contour as that of the milling cutter or burr.
Figure 10 is a detail view of a pivot mounting post showing its attached head member and an attachable bottom link.

Referring to Figure 9, there is shown a follower pointer 36' having a spherical point. There is also shown a milling tool 34' having a milling burr at its end which is of the same contour and substantially the same size as the spherical point on the follower pointer 36'. The follower pointer 36' is now used to replace the follower pointer 36 in the follower chuck 37. The indicator 34 is removed from the milling chuck 35' and the milling tool is placed in the milling chuck. By bringing the follower pointer 36' into contact with the surface of the master impression, the milling tool may be brought against a corresponding surface of the dental plate and secured in its chuck in the proper position.

The milling operation is now carried out. The milling tool 34' having the milling burr on its end is rotated by means of the spindle on which its chuck is mounted, as will be described later. In carrying out the milling operation, whereby the contour of the master impression MI in the surface of the dental plate DP, it is merely necessary to trace over the surface of the master impression with the follower point 36' and the milling burr 34' cuts off or mills off the extra surface thickness with which the dental plate was made in the First phase operation. In other words, the reduced gum contacting surface of the denture DP will be enlarged so that it will exactly conform to the patient's gum, this enlargement being obtained by means of a duplicating milling process wherein an impression of the patient's gum serves as the controlling matrix. The positioning platforms 30 and 33 are each provided with mounting top surfaces which are inclined towards the duplicating machine as shown in Figures 2, 6 and 8. This inclined feature of the platforms is desirable in order that certain milling may be fully carried out in the front part of the dental plate. In carrying out the milling operation, the corresponding other sets of positioning holes 31—31' in the respective platform surfaces may be used for positioning the moulding forms 10 and 10' as all areas may not always be reached when the center set of holes are used for holding the moulding forms.

In carrying out this method of producing dental plates, any distortion, that may have taken place in the forming of the dental plate as a result of stresses and strains, is overcome as the contour of the impression is duplicated in the surface of the dental plate. By this method of duplicating the contour of the impression in the dental plate, a dental plate is produced which will conform strictly with the configuration of the impression and it will accurately fit the part of the mouth for which it is intended.

LOCATING AND MEASURING ERRORS IN DENTAL PLATES

In case it is desired to locate and measure errors in already-formed dental plates, whether such plates were prepared by the method previously described or by other methods, the following described method may be employed.

An impression is taken of the mouth for which the already-formed dental plate has been prepared. This impression may be coated with a very thin coat of a sealer, such as a lacquer, to preserve its contact surface. The impression from which the dental plate was made may, however, be used instead of taking the new impression of the mouth. Either of these impressions is placed, leveled and secured in the moulding form 10, as shown in Figure 7, in the same manner as was described supra under the heading "Second phase."

The dental plate whose contact surface is being tested for errors is placed, leveled and secured in the moulding form 10', as shown in Figure 7, in a manner as was also described under the heading "Second phase."

The moulding form 10, carrying the impression, and the form 10', carrying the dental plate to be tested for errors, are respectively placed on the positioning platforms 30 and 33. The level 14 is used to level the impression and the dental plate as was described supra under the Second phase.

The indicator 34 and the follower tool 36, as shown in Figure 11, are inserted in their respective chucks on the pantograph arms as was described under the Second phase for bringing the dental plate and the impression into proper lateral alignment. Since the deliberately placed reference marks, as described under the First phase and as used under the Second phase previously described, may not be available in the dental plate and the impression, it will be necessary to make a number of checks and readings on different surface points to bring the dental plate into proper lateral alignment with the impression. After proper alignment is secured suitable corresponding reference marks may be placed in the impression and the dental plate for subsequent aligning purposes. Having properly aligned the impression and the dental plate, the locating and measuring of errors may now be carried out.

The follower tool 36 carried by the follower chuck 37 on the arm of the pantograph mechanism is moved so it just contacts a point on the surface of the impression. By observing the relationship of the point on the indicator member 34 with the surface of the dental plate being checked, a low spot in the dental plate will show up by reason of a gap occurring between the surface of the plate and the point on the indicator member 34b, as well as no movement being registered by the pointer 34c. To determine how much error there is at this low spot in the dental plate, the end of the indicator member 34b may be moved so that it just makes contact with the plate surface at this point, then by noting the deflection of the indicator point 34c on the scale 34d the amount of error in thousandths of an inch can be determined. This same operation may be carried out to locate and measure other low spots in the dental plate.

In carrying out the test for high spots in the dental plate, the same procedure as just described can be followed, except that the high spots will be indicated by the indicator pointer 34c moving over the indicator scale 34d. The thickness of these high spots may be read on the indicator scale 34d under the pointer 34c in thousandths of an inch.

After having marked the spots or regions where low or high errors are indicated in the dental plate and a notation of the amount of such errors having been made, the dental plate may be rectified to eliminate these errors. After the rectification has taken place, the plate may again be retested with respect to the impression for accuracy of the plate contact surface.

MACHINE

Figure 1:
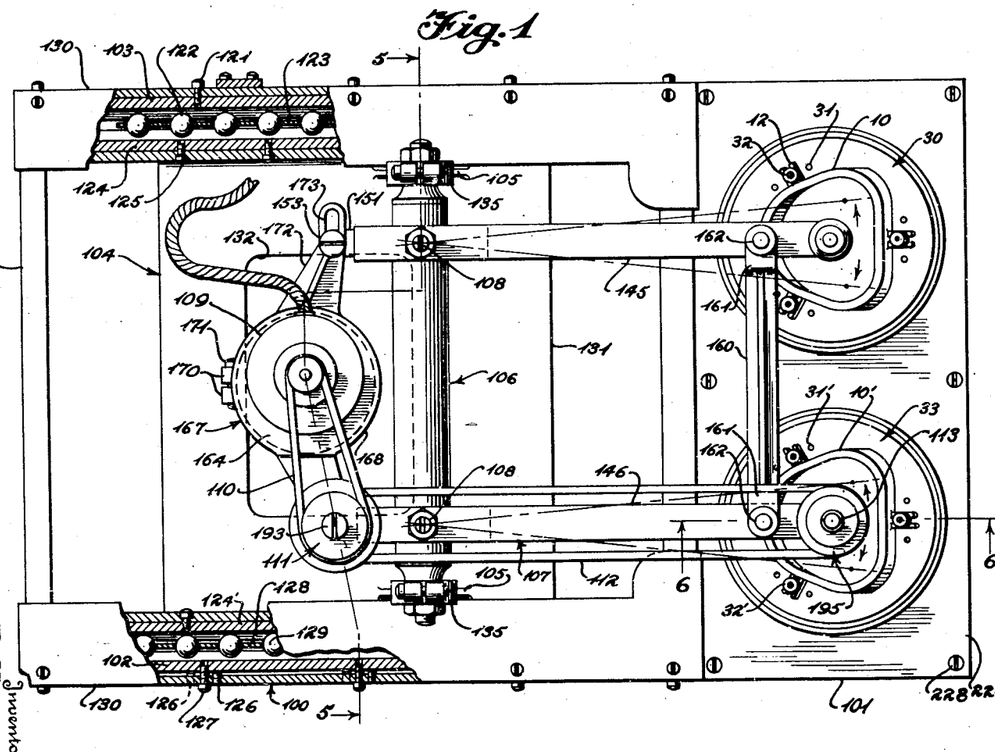
Figure 1 is a plan view partly broken away of the precision duplicating machine and the positioning platforms associated therewith.
Figure 5:
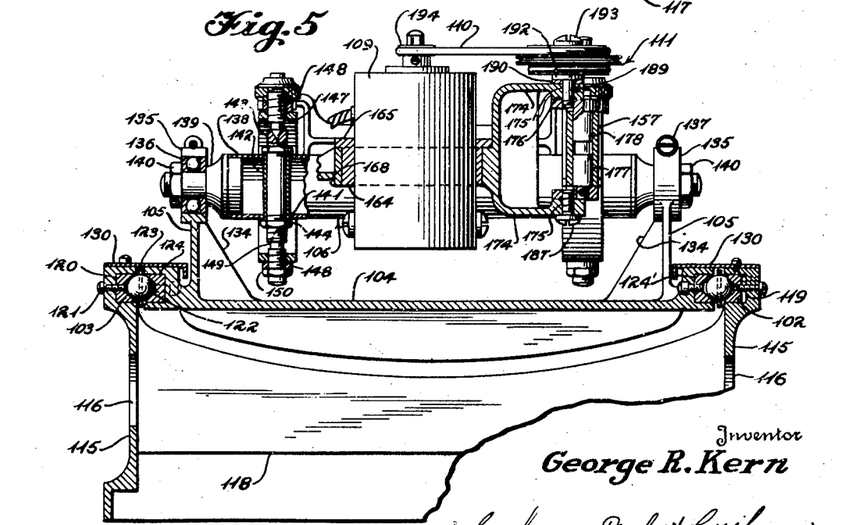
Figure 5 is a vertical view taken on the line 5—5 of Figure 1.

Referring to Figures 1, 2 and 5, the duplicating or profiling machine is comprised of a supporting frame generally indicated at 100 formed with an extended bed portion 101. This supporting frame has secured thereto, two horizontal tracks 102 and 103 within which is slidably mounted a carriage 104 formed with two upstanding yokes 105—105 which rotatably support a tubular cross member 106.

Figure 3:
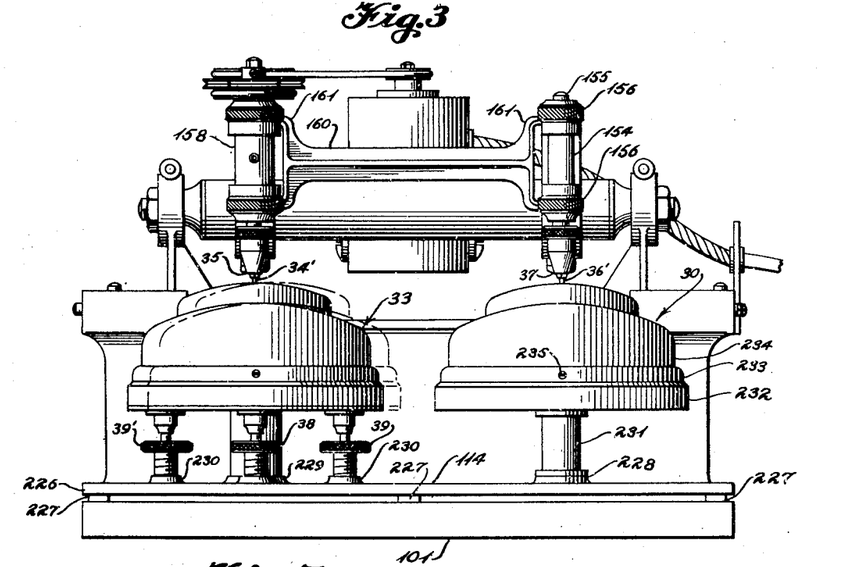
Figure 3 is a front elevation of the mechanism shown in Figure 1.

A pantograph mechanism, generally indicated at 107 and pivotally mounted at 108—108 to the cross member 106, carries the follower chuck 37 in which is held the follower pointer or tracer 36', and the milling chuck 35 in which is held the milling burr 34', all as shown in Figures 3 and 9. An electric motor 109, mounted at the rear of the pantograph mechanism, supplies driving power by belt 110 to intermediate pulleys 111, thence by a belt 112 to rotate a spindle 113, having attached at its lower end the said milling chuck 35 in which is held said milling burr 34'.

The bed portion 101, of the supporting frame 100, as shown in Figure 3, serves as a support for a plate member 114 on which is mounted the fixed positioning platform, generally indicated at 30, and the adjustable platform 33.

Supporting frame

The supporting frame generally indicated at 100 is preferably made of cast iron and is relatively heavy, thereby serving as a rigid base for the precision duplicating mechanism. The frame support 100 comprises an extending bed portion 101, two sides walls 115—115, each formed with three lightening openings 116, two end walls 117, best shown in Figure 4, whose top portion is arc-shaped, and two intermediate ribs 118—118, the top portions of the ribs are likewise arc-shaped similar to the end walls 117. The upper inner portion of each side wall is formed with rectangular recesses 119 and 120, which serve as a mounting for the track members, hereinafter more fully described.

Track assemblies

Within the rectangular recess 120 in the upper portion of the left-hand wall 115 of supporting frame 100, as viewed in Figure 5, is secured a track 103 by cap screws 121. The exposed surface of the track 103 is formed with a groove in which antifriction ball bearings 122 roll, as shown in Figures 1 and 5. A ball retainer strip 123 serves as a spacer and retainer for the ball bearings 122. A track 124, similar to track 103, is mounted in a rectangular recess portion formed in the adjacent edge of the carriage 104 and is secured by countersunk cap screws 125.

Within the rectangular recess 119 in the upper portion of the right-hand wall 115 of supporting frame 100, as viewed in Figure 5, is adjustably mounted a track 102, similarly shaped to track 103. Referring to Figure 1, set screws 126 serve as an adjusting means for spacing the track 103 in the rectangular recess 119. Cap screws 127 pass through apertures in the right-hand side wall 115 and screw into the track 102, thereby holding it tightly in adjusted position against the ends of the set screws 126. A ball retainer strip 128 holds the ball bearings 129 in spaced relationship, while a track 124', like track 124, is mounted in a recessed portion formed also in the other edge of the carriage 104 and serves as a cooperating track surface for the ball bearings 129.

Cover plates 130—130 are secured in the frame support 100 over each track and are of such a shape that they protect the tracks and ball bearings. The end portions of the cover plates 130—130 are so formed that they serve as stops for movement of the carriage 104 at each end of its travel within the supporting frame 100.

Carriage

Figure 4:
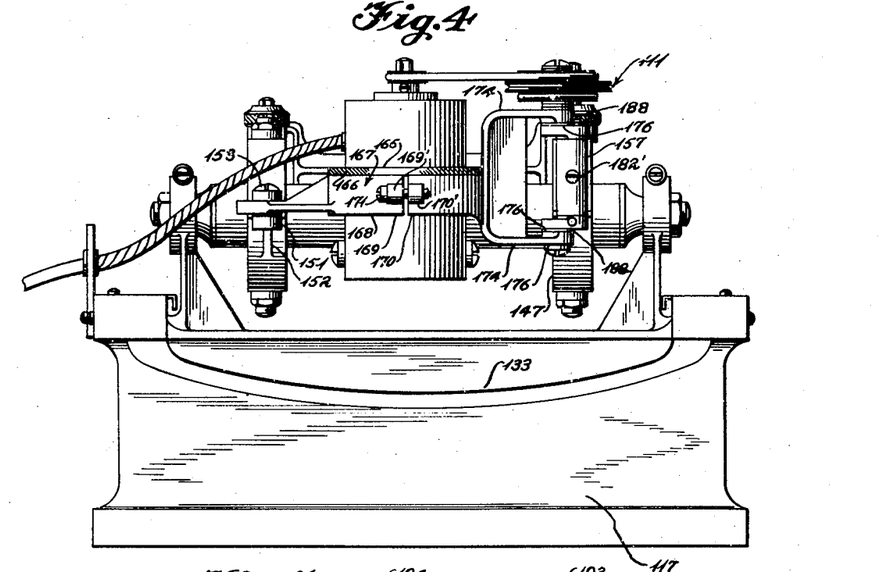
Figure 4 is a rear elevation of the mechanism shown in Figure 1.

The carriage 104 is preferably cast of magnesium and has a general square-shaped base portion 131 with a lightening hole 132, also square shaped, as shown in Figure 1. The edge portions of the carriage are formed with rectangular recess portions for track mountings, as described, supra. The underneath side of the base portion 131 is formed with strengthening webs 133 whose outer or bottom portions are arc-shaped, as shown in Figure 4. Two upstanding yokes 105—105 are formed on the upper part of the carriage, as shown in Figure 5, and have strengthening web portions 134. The upper portions of the yokes are in the form of cylindrical collars as indicated at 135 (see Figure 2), within which is mounted a ball bearing assembly 136. The upper mid-portion of each yoke is split and formed with lugs 135'—135', one of which lugs is apertured while the other is apertured and threaded to receive a tightening cap screw 137.

Pantograph mechanism

The pantograph mechanism, generally indicated at 107, is pivotally mounted at 108—108 to the tubular cross member 106, as shown in Figures 1, 2 and 5. Referring to Figure 5, the tubular cross member 106 is comprised of a tube 138, each end of which has secured therein a journal member 139, formed with a journal surface which rides in the bearing assemblies 136. These journal members 139—139 are threaded at their outer ends and are held in position by the nuts 140—140 screwed onto the threaded end portions. The tube 138 has two parallel transverse openings therethrough at 141—141 in which are secured cylindrical bearing tubes 142—142. Within each bearing tube is mounted a spindle member 143 having a threaded lower portion on which is screwed a securing nut 144. The end portions of each of the spindle members 143 are formed with an inwardly extending conical bearing surface.

The left-hand spindle of Figure 5 serves as a pivotal mounting for an arm 145, as shown in Figure 1, of the pantograph mechanism, while the right-hand spindle of Figure 5 serves as a pivotal mounting for the arm 146 of the pantograph mechanism. Each arm 145 and 146 is formed with a circular walled portion as indicated at 147 in Figures 1 and 5. The circular walled portions 147—147 of the arms have therein diametrically threaded holes 148—148, as shown in Figure 5, in which are screwed conical ended screws 149. The conical end of each screw 149 bears on the conical bearing surfaces in the end of the spindle 143 and thereby is provided a pivotal support for arms 145 and 146. Securing nuts 150 are screwed onto the end of each screw 149 and hold them securely in adjusted position.

Arm 145 of the pantograph mechanism terminates at its rear end in a flat supporting portion 151, as shown in Figures 1 and 4. This end portion 151 is given strengthening support by a web 152, as best shown in Figure 4. The rear portion 151 has a threaded aperture which receives a cap screw 153 securing one end of the motor mounting to the arm 145.

The forward end of arm 145 is formed with a vertical sleeve 154, as shown in Figure 3, threaded at each end and having an inner vertical cylindrical cavity which serves as a mounting for a follower spindle 155. Still referring to Figure 3, securing collars 156—156 are screwed onto the threaded end portions of the vertical sleeve 154 and hold the spindle in position in the same manner as will be described hereinafter for the milling spindle carried by the other arm 146 of the pantograph mechanism. The follower chuck 37 screws onto the lower end of spindle 155 and secured in this chuck is the follower pointer or tracer 36'.

Arm 146 of the pantograph mechanism terminates at its rear end in a vertical cylindrical sleeve 157 (see Figures 2, 4 and 5) having top and bottom horizontal bearing surfaces and a vertical cylindrical capacity therein. The sleeve 157 serves as a mounting for the other end of the motor mounting to be described hereinafter.

The forward end of arm 146 (see Figures 2, 3 and 6) is formed with a vertical sleeve 158 having therein a bearing mounting for the milling spindle, all to be described later.

The arms 145 and 146 have formed thereon toward their forward ends bearing portions 159—159 each of which has a vertical cylindrical bearing cavity. The arms 145 and 146 are pivotally connected together at bearing portions 159—159 by a cross member 160, bifurcated at each end as indicated at 161—161 (see Figures 1, 2 and 3) and held in pivotal position by pivot posts 162—162 which are secured in position by set screws 163—163.

*Motor and intermediate pulley mountings*

A motor 109 is mounted in a vertical position in a surrounding eccentric collar 164 formed with a horizontally extending shoulder 165 at its top, said shoulder having its outer vertical periphery knurled at 166, as best shown in Figures 4 and 5. A motor mounting bracket is generally indicated at 167. The eccentric collar 164 is supported in a vertical cylindrical portion 168 of the motor mounting bracket 167 as shown in Figures 1 and 4. The cylindrical portion 168 is formed with two end portions 169 and 170 having a gap formed therebetween. Each end portion carries lugs 169' and 170', 170' is apertured and threaded to receive a tightening cap screw 170 which passes through an aperture in lug 169'. By setting up on screw 171 the lugs 169' and 170' are brought closer together and the cylindrical portion 168 tightens about the collar 164.

The left-hand portion of the motor mounting bracket 167 is formed with an extending lug 172 having a slotted end bearing portion 173 which is supported on the end portion 151 of arm 146. A vertical screw 153 is screwed into a thread portion in the end 151 of arm 146 and serves as a guide post for the slot 173 on the end of the motor mounting bracket.

The right-hand end of the motor mounting bracket 167 is bifurcated as indicated at 174—174 and each end of the bifurcated portions has a vertical bearing aperture 175 and two horizontal bearing surfaces indicated at 176.

The vertical cylindrical sleeve 157 on the rear end of arm 146 of the pantograph mechanism has mounted in its vertical cylindrical cavity 177, a vertical post 178. The details of the vertical post are best shown in Figure 10. The post 178 is formed with a partial cylindrical head 179 having a horizontally extending partial cylindrical lug portion 180 of a slightly reduced vertical thickness as compared with a vertical thickness of the head. The extending lug portion has a threaded vertical aperture 181. At the center of the post 178 there is a reduced cylindrical portion 182 which receives the end of a securing set screw 182' screwed through the wall of the vertical cylindrical sleeve 157 as shown in Figure 4. The lower end of the post 178 has a reduced cylindrical portion 183 having a horizontally extending aperture 184 extending therethrough. This cylindrical portion 183 receives a link member generally indicated at 185, similar to the head 179—180, but having a horizontally extending aperture 186. Link 185 is held on the cylindrical portion 183 of the post 178 by a suitable pin which passes through the aligned apertures 186, in the post, and 184, in the link member. This pivoted post with its head and bottom link acts as a bell-crank lever as will be described hereinafter. Referring to Figures 4 and 5, there is shown the pivoted attachment of the bifurcated ends 174—174 of the motor mounting bracket 167 with the head 179—180 and the bottom link member 185 of the post 178. The bottom bifurcated end 174 is pivotally secured to the extending portion of the link 185 by a screw 187. In Figure 4 there is shown horizontal spacer washers 188 interposed between the bifurcated ends and their respective bearing mountings.

In Figure 5 the pivoted mounting of the upper bifurcated end 174 of the motor mounting bracket 167 is shown. A vertical pulley post generally indicated at 189 has a threaded lower end which screws into the threaded aperture 181 on the extending head portion 180 of the post 178. The lower portion of the post has a cylindrical portion which serves as a pivotal mounting for the cylindrical aperture 175 in the upper bifurcated end 174 of the motor mounting. The post 189 is further formed with a horizontally extending collar 190 at its center portion whose periphery is hexagonally shaped to serve as a tightening and loosening means for the post. Above this collar portion 190 the post is formed with a cylindrical portion which serves as a bearing mounting for the integrally formed pulleys generally indicated at 111. A cylindrical spacer member or washer 192 is placed over the upper cylindrical portion of the pulley post and between the collar 190 and the lower pulley. The upper cylindrical portion of the pulley post 189 is formed with a threaded cavity to receive the securing cap screw 193 which serves to hold the pulleys 111 in position on the pulley post.

The electric motor 109 carries a driving pulley 194 which is connected by a belt 110 to the intermediate pulleys generally indicated at 111. By adjusting the vertical position of the motor in its mounting, by loosening and tightening screw 171, any one of the pulleys indicated at 111 may be used. Having selected the desired pulley, the belt 110 is tightened by loosening up on screw 171, turning the eccentric collar 164 by means of the knurled surface 166 to move the motor horizontally away from pulley post 189 and then tightening up on screw 171 to hold the motor in its adjusted position.

To tighten the belt 112 (see Figure 1) which connects the intermediate pulleys 111 with the integrally formed pulleys, generally indicated at 195, on the milling spindle 113, set screw 182' (see Figures 4 and 5) is first loosened. The vertical pivot post 178 and its attached head 179—180 and the link member 185 serving as bellcrank levers are rotated thereby moving pulley post 189 and screw 187 horizontally away from the spindle 113 and its pulley 195 to tighten the belt 112. Having obtained the proper adjustment, screw 182' is tightened so as to hold the pivot post 178 and its attached bell-crank levers in position.

During the tightening of the belt 112, the motor mounting bracket 167 carying the motor 109 will also move since the bifurcated ends of the motor mounting bracket are respectively pivotally mounted on the pulley post 189 and the screw 187. As the motor mounting bracket 167 is moved, its left-hand slotted end bearing portion 173 moves freely relative to its vertical guide screw 153 as best shown in Figure 1. The adjustments of the motor drive belt 110 will therefore not be changed by the tightening of the belt 112. Likewise, any adjustment of belt 110 does not affect the adjustment of belt 112.

The integrally formed intermediate pulleys 111 and the integrally formed pulleys 195 are of such circumferential size that the belt 112 will fit either set of corresponding pulleys. Thus, if it is desired to change the rotary speed of the spindle 113, it is only necessary to shift the belt 112 to the desired corresponding pair of pulleys.

The intermediate pulley post 189 and its mounting in the bell-crank lever 179-180, attached head of the pivot post 178, serves an additional function to that of a belt tightening means for belt 112. Certain torque forces that are set up when the milling burr 34' is cutting will be transmitted through the belt 112 to the intermediate pulley post 189 and will tend to move the vertical pulley post 189 laterally. Since the vertical pulley post is secured in the end of the bell-crank lever 179—180, the lateral forces tending to move the pulley post 189 will be transmitted to the end of the bell-crank lever 179—180. The bell-crank lever 179—180 will tend to absorb these forces since it is the attached head of the pivot post 178 which is restrained from rotary movement by its adjusting set screw 182'. By these torque force restraining means the tendency of such torque forces to move the pantograph mechanism and the motor mounting laterally is reduced, thereby permitting greater stability and precision in the duplicating operation.

Bearing for milling spindle

Referring to Figures 2 and 6, milling spindle 113 is shown mounted in a bearing contained within vertical sleeve 158 formed on the end of arm 146 of the pantograph mechanism.

The milling spindle 113 is formed at its upper end with a vertical flat portion 196 against which rides a set screw 197, screwed in a shoulder portion 198 of pulleys 195, to hold the pulleys in fixed relation to the spindle. Towards the lower end of the spindle there is formed on the spindle a horizontally extending cylindrical thrust shoulder 199. On the extreme lower end of the spindle there is mounted the milling chuck 35 which receives the milling burr or tool 34'.

The vertical sleeve 158 on the end of arm 146 is formed with a vertical cylindrical bearing cavity 200 and a vertical cylindrical oil passage 201.

An upper and lower group of needle bearings generally indicated at 202 and 202' contained within a cylindrical bearing retainer having a flanged bearing surface at each end are mounted respectively about the upper and lower portions of the spindle 113 and within the surrounding bearing cavity 200. A cylindrical bearing spacer 203, within the bearing cavity 200, surrounds the mid-portion of the spindle and its upper horizontal surface serves as a bearing for the lower end of the upper group of needle bearings 202 while its lower horizontal surface serves as a bearing for the upper end of the lower group of needle bearings 202'. The cylindrical spacer 203 is formed with a reduced cylindrical portion 204 at its center portion which has a horizontal oil passageway 205 extending from said reduced cylindrical portion to the inner cylindrical surface of the sleeve. Adjacent the reduced cylindrical portion 204 there is a suitable oil passage 206 formed in the wall of the vertical sleeve 158 through which oil may be introduced to the inner bearings generally.

A first lower thrust washer 207 fits in a cylindrical cavity 208 formed in the bottom end of the sleeve 158 and its upper surface acts as a bearing for the lower end of the lower group of needle bearings 202'. The lower surface of thrust washer 207 acts as a bearing surface for the upper surface of the spindle shoulder 199.

A lower securing collar 210 is formed with three internally stepped cylindrical portions 211, 212 and 213, and an internally threaded portion 214. Cylindrical portion 211 serves as a pocket for a felt packing washer 215; cylindrical portion 212 forms a pocket for a second lower thrust washer 209 and the latter's upper surface forms a bearing for the lower surface of the thrust shoulder 199 on the spindle; cylindrical portion 213 forms an annular oil pocket about the periphery of the thrust shoulder 199 of the spindle as well as a passageway to the lower end of the vertical oil passage 201 in the sleeve 158; and the threaded portion 214 of the collar serves to secure the collar 210 to a threaded lower portion on the vertical sleeve 158.

An upper securing collar 216 is formed with two internally stepped cylindrical portions 217 and 218, and an internally threaded portion 219 which serves to threadedly hold the cap to a threaded upper portion of the vertical sleeve 158. The cylindrical portion 217 of the collar 216 serves as a pocket for a felt packing washer 220. The cylindrical portion 218 serves as a pocket within which is positioned a retaining washer 221. The retaining washer 221 is formed with a cut-away portion on its lower surface which forms an oil groove 222. The oil groove 222 serves as a passageway so that oil flows from the upper end of the vertical oil passage 201 to the upper group of needle bearings 202.

The oil circulation in the bearing is in general motivated by the oil being thrown centrifugally from the peripheral surface of the thrust shoulder 199 on the rotating spindle 113. The oil is forced outwardly in the annular pocket surrounding the shoulder 199 and then into the lower end of the vertical oil passage 201 where it rises upwardly and flows from the top of the oil passage 201, through the oil groove 222 to the upper group of needle bearings 202. From the upper group of needle bearings 202 the oil flows downwardly to the lower group of needle bearings and thence is recirculated.

*Fixed and adjustable positioning platforms*

The extending bed portion 101, of the supporting frame generally indicated at 100, is formed with a floor portion 225 as shown in partial section in Figure 6. On the upper surface of the floor portion 225 is mounted a rectangular shaped plate 226.

Referring to Figures 1, 2, 3 and 6, the plate 226 is shown as being formed with six downwardly extending lugs 227. Extending through the plate 226 and the lugs 227 are apertures, the tops of which are countersunk to receive holding down screws 228 which are screwed at their lower ends into threaded cavities in the floor 225 and bed 101. Formed on the upper surface of the plate 225 are two main bosses 228 and 229 and four secondary smaller bosses indicated at 230.

The fixed positioning platform or work holder generally indicated at 30 is mounted on boss 228. The fixed positioning platform comprises a cylindrical pedestal 231 whose lower end is threaded with a cooperating threaded portion in boss 228 and the plate 226. The pedestal supports a cylindrical plate 232 having an upstanding reduced cylindrical collar 233 formed on its top. Within the upstanding collar 233 and on the inner top surface of the plate 232 there is positioned a solid cylindrical bed 234 whose top surface is sloped at an angle of about sixteen degrees. When in proper position the sloped top of the bed 234 inclines toward the duplicating or profiling machine and is held in this position by set screws 235 extending horizontally through the wall of the upstanding collar 233. The top surface of the bed 234 has three sets of tapped holes 31 (see Figure 8), each set of which is spaced so as to receive holding down screws 32 which pass through slots in the lugs 12 on the moulding form 10, the purpose of which is described supra under the Second phase of the method steps.

The adjustable positioning platform generally indicated at 33 is mounted on a boss 229. A pedestal generally indicated at 235 (see Figure 6) is formed with a central cylindrical portion 236, a lower reduced cylindrical portion 237 threaded at its lower end 237', and an upwardly extending truncated cone portion 238 which terminates at its top in a threaded portion 239. The lower reduced cylindrical portion 237 of the pedestal 235 is mounted in an aperture extending through the boss 229, the plate 226 and the floor 225, and is held in a secured position by a nut 240.

A spherical element 241 having a threaded cavity is screwed onto the threaded top portion 239 of the pedestal 235 and serves as a universal joint for a support element generally indicated at 242 which may be tilted in any direction to an amount of about sixteen degrees.

The support element generally indicated at 242 is formed with a circular plate portion 243 having a hollow cylindrical depending boss 244. The hollow portion of the depending boss 244 has an upper cylindrical surface as at 245 which terminates in a spherical surface 246 in which the spherical element 241 is seated, while the extreme lower internal surface is a truncated cone as indicated at 247. The truncated cone surface 247 is in spaced relationship with the truncated cone surface 238 on the pedestal 235.

On the flat top surface of the support element 242 there is slidably mounted a cylindrical plate 257 having an annular depending boss portion 258 and an upstanding reduced cylindrical collar 259. An annular cylindrical plate member 260 is secured to the depending boss portion 258 of the cylindrical plate 257 by suitable screws 261. The top surface of the annular cylindrical plate member 260 slidably fits with the lower surface of the support element 242. The cylindrical plate 257 by this mounting may be slid in any direction with respect to its supporting element 242. In Figure 2 the adjustable positioning platform is shown in broken lines in an adjusted position.

Within the upstanding collar 259 and on the inner top surface of the plate 257, there is positioned a solid cylindrical bed 262, whose top surface is sloped at an angle of about sixteen degrees. When in proper position, the sloped top of the bed 262 inclines toward the duplicating or profiling machine, and is held in position within its mounting by set screws 263 in the wall of collar portion 259. The top surface of the bed 262 has three sets of tapped holes 31'( see Figure 8), each set of which is spaced so as to receive holding down screws 32' which pass through slots in the lugs 12' on the moulding form 10', the purpose of which is described supra, under the Second phase of the method steps.

Against the bottom surfaces of the annular cylindrical plate member 260 there slidably bears four depending socket members 251 (see Figure 6), spaced ninety degrees apart. The socket members 251 are formed with an upper flanged portion 252, the top surface of which slidably bears against the bottom surface of the annular cylindrical plate member 260, and a spherical inner surface as indicated at 253. On each spherical surface 253 and within the sockets, there is positioned spherical elements 254 having a threaded cavity. These spherical elements 254 serve as universal joints.

Threaded into each threaded cavity of the spherical elements 254 is an upper threaded portion 255 on the adjusting screws 38—38' and 39—39' (see Figures 3 and 6). The lower portion of each adjusting screw is formed with a threaded portion 256 which screws into a threaded aperture in the bosses 230 and the plate 226 on which the bosses are formed. By means of these adjusting screws 38—38' and 39—39', the adjustable positioning platform generally indicated at 33 is held in any slid and tilted position.

By the phrase "reduced contact surface" in the claims it is meant that any concave portion of the contact surface of the denture will be too small to fit the complementary convex surface of the patient's mouth, and that any convex or planar surfaces of the denture preferably will bear sufficient surplus material that they, too, will fail to fit the patient's mouth.

Since various modifications to the invention which incorporate the novel features thereof will be apparent to those skilled in the art, it is intended that the scope of this invention is to be limited only to the following claims.

I claim:

1. The method of forming an accurately fitting denture comprising preparing an impression complemental to the patient's gum, preparing a denture with a gum contacting surface which is of reduced size, and then enlarging the gum contacting surface of the denture to the size of the corresponding surface of said impression by a duplicating milling process in which said impression serves as the controlling matrix.

2. The method for forming an accurately fitting denture comprising preparing an impression complemental to the patient's gum, preparing an uncured denture with a gum contacting surface which is of reduced size, curing the denture and, to compensate for warpage of the denture during curing, then enlarging the gum contacting surface of the denture to the size of the corresponding surface of said impression by a duplicating milling process in which said impression serves as the controlling matrix.

3. The method of forming an accurately fitting denture comprising preparing an impression complemental to the patient's gum, preparing a denture with a gum contacting surface which is of reduced size to an extent of the order of a few thousandths of an inch, and then enlarging the gum contacting surface of the denture to the size of the corresponding surface of said impression by a duplicating milling process in which said impression serves as the controlling matrix.

4. The method of forming an accurately fitting denture comprising preparing two impressions complemental to the patient's gum, adding material to the gum contacting surface of one of the impressions to render such surface of reduced size to the order of a few thousandths of an inch, forming a cast from the last-mentioned altered impression, forming an uncured denture from the cast, curing the denture, and then subjecting the denture to a duplicating milling process in which the other and non-reduced impression serves as the controlling matrix.

5. The method of forming an accurately fitting denture comprising preparing an impression complemental to the patient's gum, forming a cast from said impression, treating the surface of the cast corresponding to the surface of the patient's gum to remove material therefrom, forming an uncured denture from the cast, curing the denture, and then subjecting the denture to a duplicating milling process in which the impression complemental to the patient's gum serves as the controlling matrix.

6. The method of forming an accurately fitting denture comprising preparing an impression complemental to the patient's gum, forming an uncured denture having a gum contacting surface which is a facsimile of said impression, adding material to the gum contacting surface of said uncured denture, curing said denture, and then removing sufficient of said added material to bring the gum contacting surface of said denture into conformity with said impression of the patient's gum by a duplicating milling process in which said impression serves as the controlling matrix.

GEORGE R. KERN.

REFERENCES CITED

The following references are of record in the file of this patent:

UNITED STATES PATENTS

| Number | Name | Date |
|---|---|---|
| 653,494 | Wenzel | July 10, 1900 |
| 757,833 | Paine | Apr. 19, 1904 |
| 1,039,406 | Hundrieser | Sept. 24, 1912 |
| 1,443,624 | Heise | Jan. 30, 1923 |
| 2,017,843 | Cuthbert | Oct. 22, 1935 |
| 2,168,530 | Kyprie | Aug. 8, 1939 |